Sept. 15, 1953  E. ISCHINGER, SR  2,652,012
HAND DEVICE FOR SELECTIVELY DISPENSING
AND LOCATING SMALL ELEMENTS Filed May 23, 1951  3 Sheets-Sheet 2

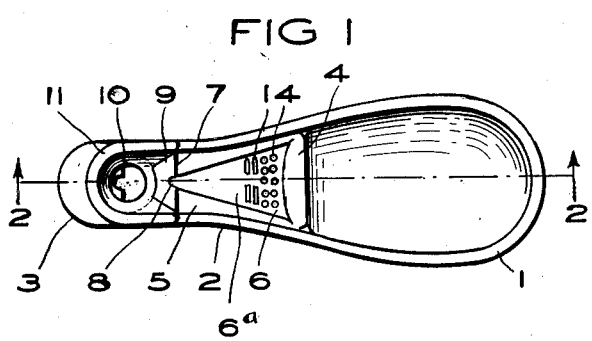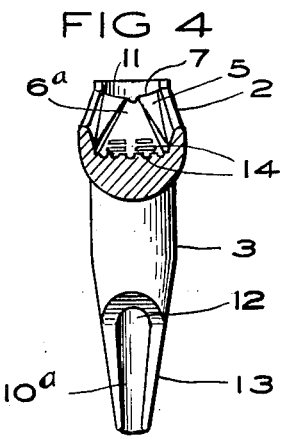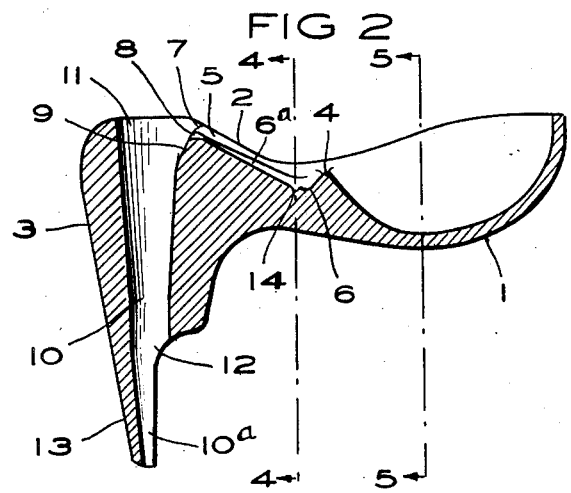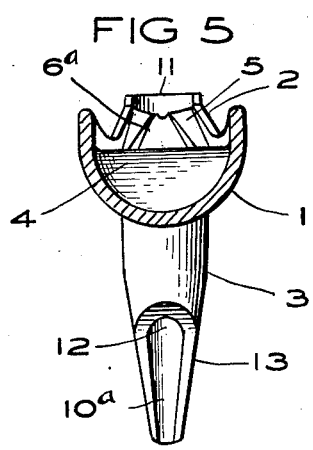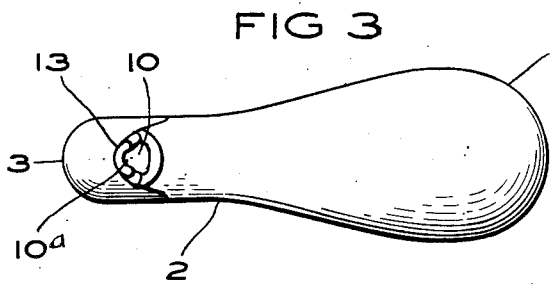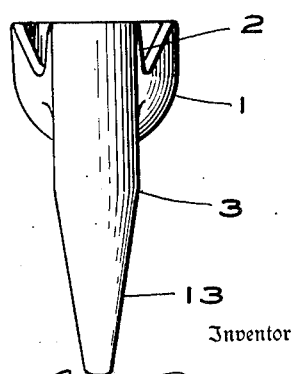

Inventor
Eric Ischinger Sr.

Patented Sept. 15, 1953

2,652,012

UNITED STATES PATENT OFFICE 2,652,012

HAND DEVICE FOR SELECTIVELY DISPENS-
ING AND LOCATING SMALL ELEMENTS

Eric Ischinger, Sr., Reading, Pa.

Application May 23, 1951, Serial No. 227,805

4 Claims. (Cl. 111—92)

This invention relates to hand operated devices for selectively separating, dispensing and directing to a desired location certain objects, or materials ordinarily maintained in massed or bulk form such as seeds, etc., that are difficult to handle individually due to their small size, shape or weight.

When planting seeds, considerable difficulties are ordinarily experienced by home gardeners due to the variations in size, shape and weight, etc., of the different seeds. The selection, separation and planting is usually performed with the fingers either with or without the aid of a suitable implement. For an inexperienced, as well as an experienced gardener, this is a tedious, troublesome and time consuming procedure, which usually also involves wastage of seeds.

One object of my invention is to provide a novel device which enables an inexperienced person to plant seed with little effort in less time than has heretofore been possible, and with practically no wastage of seeds.

Another object is to provide such a device having certain structural and functional features of advantage over similar devices of the prior art.

A further object is to provide such a device comprising a container from which the objects are dispensed and fed, and a directing element in the form of a chute member by means of which the objects are directed to a desired location, the two members being shaped and cooperatively arranged so that the device can be conveniently grasped in one hand in a natural manner so as to permit free movement or flexing of either the thumb, or the forefinger of this hand to thereby effect a contactingly traversable movement of the thumb or finger over the container to the directing element for a selective feeding of the objects from the container to the directing element or chute member of the device.

A further object is to so construct and arrange the various parts of the device so that it may be grasped by one hand and held in such manner as to facilitate a pushing or a pulling motion by the end of the finger to effect a contactingly traversable movement of the thumb or finger over the container to the directing element for selecting and feeding objects from the container to the directing element or chute member.

Still another object is to provide the device with a conditioning or transfer surface intermediate the container and the directing element or chute member for the selection and movement of the objects thereover from the container to the directing element or back into the container.

A still further object is to provide the said conditioning or transfer surface in the form of a guide channel.

A further object is to provide the said conditioning or transfer surface with means which operate on the objects in a certain manner in their movement over the conditioning surface and thus assist in the selection thereof before transmission to the directing element or chute member.

Another object is to so construct and arrange the parts of the device for the planting of seeds so that by the simple manipulation thereof with one hand and a cooperative movement or flexing or a finger of said hand, the soil may be prepared to receive the seed, the seed selected and positioned in the prepared soil, and the positioned seed covered with soil in the performance of the planting operation.

Another object is to provide a rugged construction for a device of this kind, one that can be inexpensively molded or otherwise formed in one piece.

Another object is to provide a device which includes a conditioning surface that is arranged to support objects thereon but restrains their free movement thereover except by a certain free flexing finger action in contact with the objects.

With these and other objects in view, which will become more readily apparent from the following detailed description of one of the practical and illustrative embodiments of my device shown in the accompanying drawings, the invention comprises the novel hand selecting and feeding device, its elements, features of construction and arrangement of parts in cooperative relationship, as more particularly defined by the hereto appended claims.

In the accompanying drawings:

Figure 1 is a top plan view of the selecting and feeding device embodying my invention.

Fig. 2 is a longitudinal sectional view taken as indicated by the arrows 2—2 in Fig. 1.

Fig. 3 is a bottom plan view of the device.

Fig. 4 is a cross sectional view taken as indicated by the arrows 4—4 in Fig. 2.

Fig. 5 is a cross sectional view taken as indicated by the arrows 5—5 in Fig. 2.

Fig. 6 is a front elevation of the device.

Figure 7:
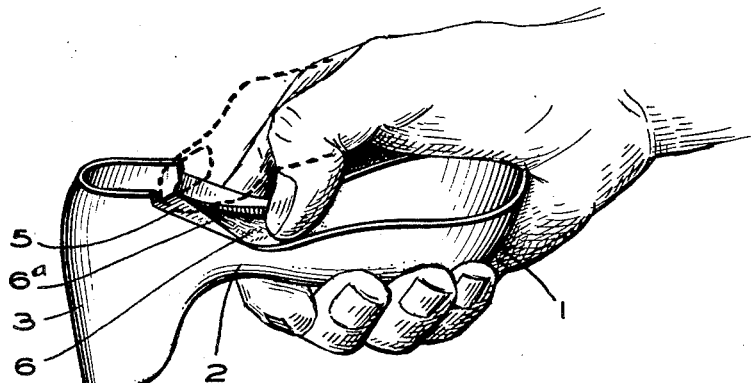
Fig. 7 is a perspective view of the device as it appears when held in the hand with the thumb thereof free to select and feed seed from the container to the directing element or chute member.

It will be helpful to a clear understanding of my invention to first briefly consider some of the more important aspects and features thereof, so that these may be kept in mind during the subsequent reading of the detailed description of the practical and illustrative embodiment of my novel device shown in the accompanying drawings. Accordingly, it is pointed out that small objects, such as flower seeds, vary greatly in size and form. Some are very small and substantially round, others are flat and disc shaped, still others are elongated and irregular in their shape, etc., and to select and dispense or feed objects having these various shapes and sizes with a single device presents a considerable problem. To accomplish this the device forming the subject matter of my present invention is provided with a container or cavity which is adapted to hold a quantity of such objects of any of the sizes and forms that are intended to be dispensed therewith. This container or cavity is shaped to serve as a handle for the device which conveniently fits the hand in such manner that the thumb or forefinger of the hand remains free so that it can flex and move relative to certain parts of the device to first effect selection and feeding of a small quantity of the objects from the container or cavity to a conditioning or transfer surface and then effect a selection and continued feeding of one or more of the preselected objects toward the directing member. This is made possible by the inclined arrangement of a portion of the wall of the container or cavity. The objects in the cavity arrange themselves against this inclined wall portion and thus permit selective separation therefrom by the tip of the finger or thumb adjacent the inclined wall portion. The flexing of the finger or thumb then provides the motive power for raising and moving only those objects over the inclined wall portion that have been selected while the remaining objects in the container or cavity will not be disturbed and cannot follow the selected objects in their movement by the finger. At the point where one or more of the objects reach the directing element or chute member, a releasing ledge is adapted to cause such objects to enter and drop into the directing element or chute member so as to have this member position and locate the object by directing it to the desired location.

The bottom of the directing element or chute member of the device is provided with an extension which is adapted to be used for the preparation of the soil in which the seed is to be planted. Its pointed end is used to break up the soil, if necessary, and form furrows therein in any spacing and depth required for the seed and in any desired arrangement thereof.

The extension at the bottom of the directing element or chute member also serves as means which permits the device to be forced into and spacedly supported above the soil to hold the container in a fixed, upright and self-supported position at a convenient point so that seed can be picked from the container and planted in the ordinary manner.

For the purpose of fertilizing soil around small plants the device may be used to control and direct the flow of fertilizer in granular or powdered form around the plant at any desired distance from it. The fertilizer in this case is placed in an open ended container for discharge into the directing element or chute member. The fertilizer thus passes through the directing element or chute member and is allowed to escape therefrom under the control of a finger, the end of which is placed over the outlet opening in the bottom of the directing element or chute member and against the extension thereof. Any desired quantity may thus be released and spacedly directed around the plant.

The container or cavity is so formed in the handle of the device that it may also be used as a scoop or trowel with which holes may be conveniently dug into the soil for the purpose of planting bulbs, roots, etc., therein. For such use the directing element serves as the handle for the scoop or trowel.

Referring now more particularly to the figures of the drawings, in which like reference characters indicate like parts, the device comprises the combined handle and container 1, which is shaped so as to conveniently fit the hand in such manner that part of the hand will extend partially or wholly over the open top of the container so as to leave the thumb or forefinger of the hand free to flex for the selecting and feeding operation. The body of the container handle 1 tapers forwardly into a reduced neck section 2 to spacedly support the nose shaped directing and locating member 3 on the container handle substantially at right angles thereto.

Extending from the hollow portion of the container handle 1, in front of the partition or movement restraining ridge 4, is the elevated transfer or conditioning surface 5. The latter is located in the neck portion 2 and inclines upwardly thereon so as to provide a pocket or depository 6 at the lower end of the transfer or conditioning surface adjacent the partition or movement restraining ridge 4. In this way the surface 5, as well as the ridge 4 restrain the free movement of the objects from the container or cavity to the chute. Only objects that are positively propelled in contact with the tip of a flexing finger can, therefore, be transmitted from the container or cavity to the chute, all others will automatically be held back by the ridge 4 or the surface 5 or both of them. A tapered channel 6ª of gradually reduced depth is provided in the transfer and conditioning surface and forms a continuation of the pocket 6 which leads to the releasing ledge 7 at the outer end of the conditioning surface. The tapered channel 6ª terminates in a small groove 8 provided in the releasing ledge 7. The releasing ledge is located near the top of the directing and locating member 3, and from it, and its groove 8, extends a downwardly incline dchute 9 into the directing tube 10. A continuous conveying surface is thus provided from the bottom of the container over the movement restraining ridge 4 into the pocket or depository end 6 of the receiving surface 5 and from this surface over the releasing ledge 7 through the chute in the directing and locating member 3. A protecting wall 11 surrounds the downwardly inclined chute surface 9 around the front and sides thereof above the chute 10.

The lower end of the directing element or chute member is cut away to provide an outlet 12 for the chute 10 at the top of this cutaway portion. The reduced portion of the directing element or chute member forms an elongated tip 13 which on one side is provided with a channel 10a to form a continuation in part of the chute 10.

The end of a finger held against the cutaway portion or tip 13 of the directing and locating member at the outlet 12, can thus readily control the flow of any material passing through the chute 10.

The transfer or conditioning surface 6 is provided with small round and elongated pockets 14 that are suitably arranged to act as separating means when a plurality of objects are simultaneously moved onto and over the transfer or conditioning surface. Some of the objects drop into these pockets as they move over the surface and remain therein while one or more continue to move on in the tapering channel 6a. By the time the remaining moving objects are close to the groove 8 at the tapering end of the channel 6a, only one of them can pass therethrough and drop over the releasing ledge 7 into the chute surface 9 and from the chute onto the directing chute 10.

The object that passes through the directing chute 10 drops from the outlet 12 thereof so that by holding the directing and locating member 3 to have it point to the location where the object is to be deposited, the object will land in the desired location.

All of the objects to be dispensed and fed by means of the device are placed into the container or cavity portion of the handle 1 and in order to feed and direct them, a few of the objects at a time are first preliminarily selected from the container or cavity and pushed or drawn over the partition or movement restraining ridge 4 into the pocket or depository end 6 of the conditioning surface 5. This is done by a movement of the end of a finger with the device held as illustrated in either of the Figures 7, 8 or 9.

Figure 8:
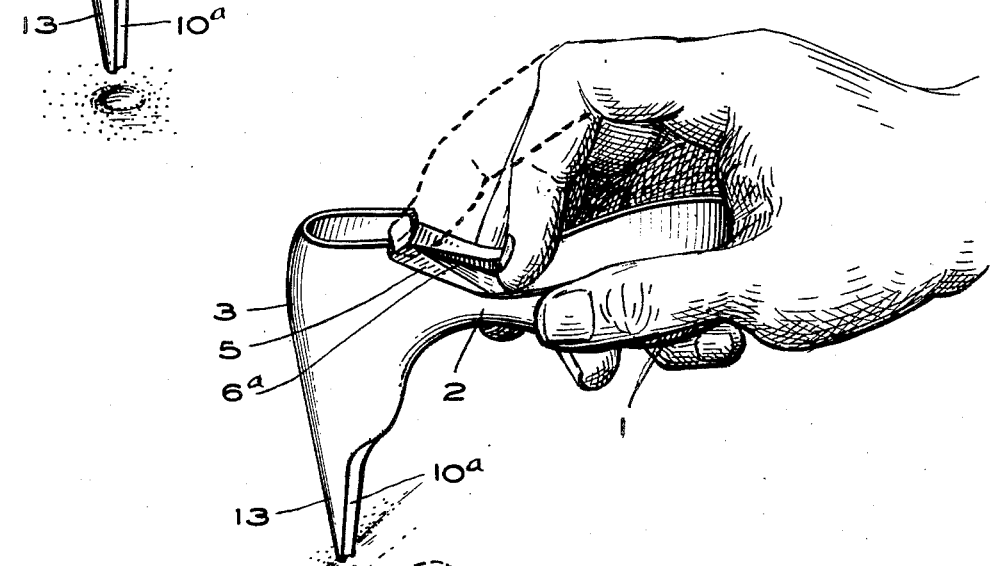
Fig. 8 is a perspective view of the device as it appears when held in the hand with the forefinger of the hand free to select and feed seed from the container to the directing element or chute member with a pushing motion.
Figure 9:
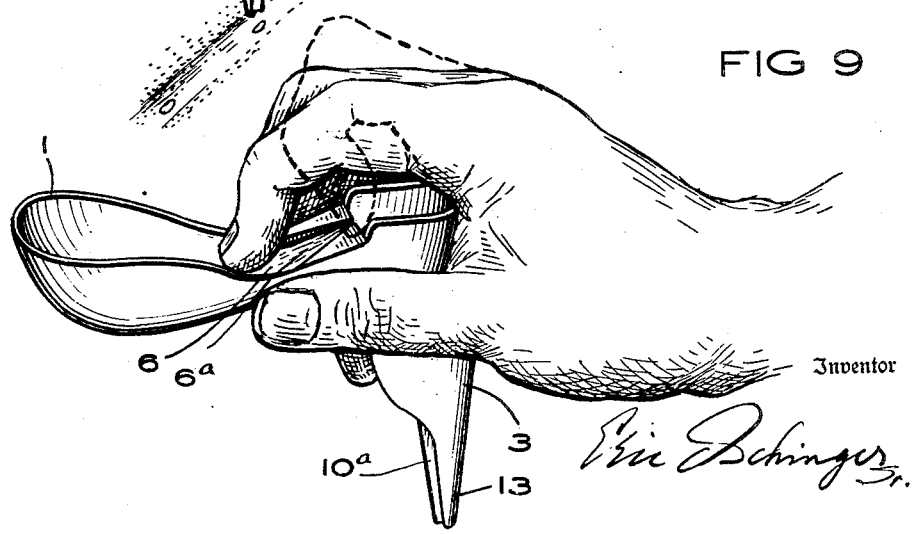
Fig. 9 is a perspective view of the device as it appears when held in the hand with the forefinger of the hand free to select and feed seed from the container to the directing element or chute member with a pulling motion.

After a number of objects, such as seeds, are thus located in the pocket or depository end 6 of the receiving surface 5, the end of the thumb or forefinger is placed over them to slide one or more upwardly in the tapering channel 6a in the manner shown in dotted line in Figures 7, 8 and 9. As above pointed out this action causes some of the objects to drop into and temporarily remain in the separating pockets 14, leaving one or only a few of them to continue to be pushed or pulled forward and upward to the releasing ledge 7 and the groove 8 provided therein. The sides of the channel 6a have the effect of retarding and directing the objects that come in contact therewith and move therealong until finally only one of the objects is being advanced to the top of the conditioning surface and pushed through the groove in the releasing ledge 7 by the end of the thumb or finger. Another method of selecting individual seeds for planting is to transfer a small number of them from the container cavity over the movement restraining ridge into the pocket or depository end 6 of the receiving surface 5. All but one of the seeds can then be readily returned over the movement restraining ridge into the container cavity, leaving the one remaining seed to be advanced into the chute member for final placement thereby.

In the use of the device as above described it is essential that it is held in substantially the manner illustrated in any one of the Figures 7, 8 or 9. When held in this manner either the thumb of the hand or the forefinger thereof is free to flex and have its end move in a substantially straight line motion from the container 1 over the partition or movement restraining ridge 4 to the releasing ledge 7.

In Figure 7 is illustrated the manner in which the device is held to have the thumb of the hand perform the selecting and feeding operation in conjunction therewith. As shown in this figure the container handle is grasped by the hand so as to partially encircle it with the thumb located over the open top of the container or cavity. This leaves the thumb free for a substantially straight flexing motion that enables the end of the thumb to push objects from the container or cavity over the partition or movement restraining ridge 4 to the pocket or depository 6 of the conditioning surface 5, and from the pocket or depository 6 over the tapering directing channel 6a to the releasing ledge 7 and the groove 8 provided therein.

In Figure 8 is illustrated the manner in which the device is held to have the forefinger perform this same selecting and feeding operation. In this case the container handle 1 is grasped by the hand so that the thumb engages one side and three fingers engage the other side of the container handle. This leaves the forefinger free over the open top of the container or cavity so that it can flex in a substantially straight line motion and push objects from the container or cavity over the partition or movement restraining ridge 4 to perform the pre-selecting operation, and from the pocket or depository 6 over the tapering directing channel 6a to the releasing ledge 7 and its groove 8 for the combined final selecting and feeding operation.

In Figure 9 is illustrated the manner in which the device is grasped by the hand to have the forefinger thereof perform the selecting and feeding operation with a drawing motion instead of a pushing motion as illustrated in Figure 8. As shown in Figure 9 the device is grasped for this purpose with the hand around the directing and locating member 3 so as to allow the forefinger to flex in a substantially straight line motion to provide a drawing action for the end of the finger from the container or cavity over the partition or movement restraining ridge 4 into the pocket or depository 6, and from the pocket 6 over the upwardly inclined tapering directing channel 6a to the releasing ledge 7 and the groove 8 provided therein.

Figure 10:
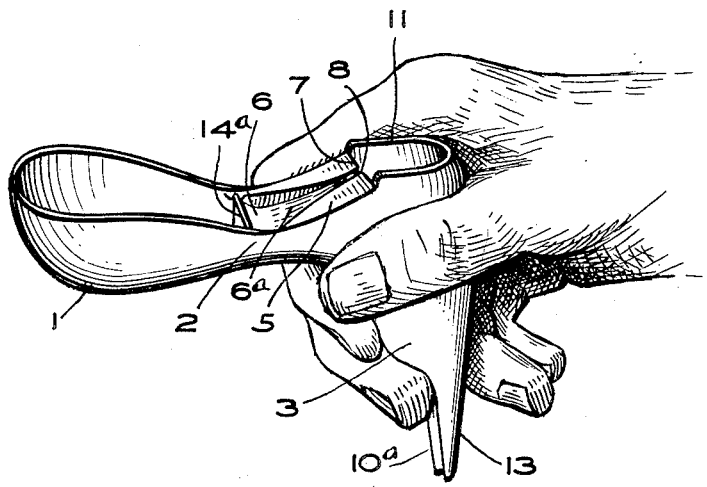
Fig. 10 is a perspective view of the device as it appears held in the hand for the purpose of controlling the flow of granulated or powdered material through the directing element or chute member.

Figure 10 illustrates the device for use in controlling the flow of granulated or powdered material therethrough and directing same to any desired location. Such material may be fertilizer to be deposited or spread around a plant. One way of operating the device for this purpose is to grasp it as illustrated in Figure 10 with the material in the container 1, then tilting it to have the material flow from the container or cavity thru the directing channel 6a over the releasing ledge 7 and throgh the groove 8 into the top of the chute 10 with the end of the finger held against the outlet 12 thereof. The directing tube is thus filled so that the directing and locating member 3 may then be pointed to the location where the material is to be deposited. A partial or complete withdrawal of the end of the finger from the outlet 12 will then cause the material to issue therefrom for deposit in the way it is directed by the directing and locating member 3 and released by the end of the finger.

In order to facilitate the flow of the material from the container or cavity to the directing channel 6ᵃ, the device may be provided with a removable partition 14ᵃ which is adapted to slide in and out of the neck section 2. When this partition is removed, any obstruction to the flow of the material into the directing channel 6ᵃ is reduced so that the device by tilting it can cause the material to flow from the container or cavity into the directing and locating member 3.

Instead of placing the material into the container it may be supplied from a separate container that can be supported on top of the directing and locating member 3. In this case the material will flow from a suitable opening in the bottom of such a container directly into the directing tube 10 for the control and direction as above described.

Figure 11:
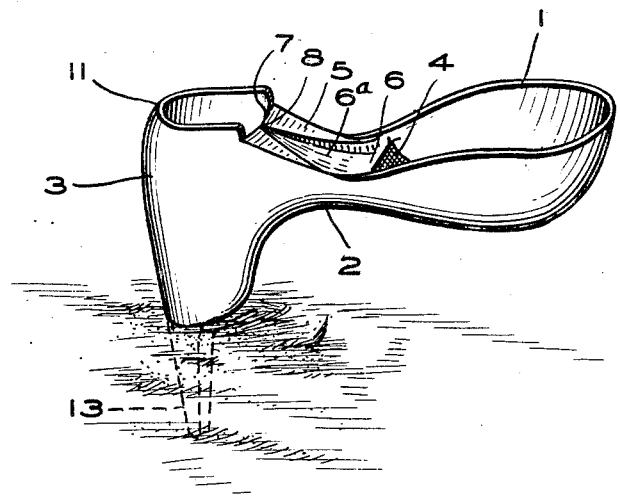
Fig. 11 is a perspective view of the device as it appears when used as a self-supported container near the location where the planting is to take place in order that the seed may be conveniently selected therefrom for planting in the usual manner.

In Figure 11 is illustrated the manner in which the device may be used for planting seed in the ordinary manner. The seed to be planted are placed into the container or cavity and the tip 13 of the directing element or chute member is forced into the ground close to where the planting is to take place. The container or cavity with its seed is thus conveniently located and self-supported so that the seed may be selected and withdrawn therefrom as needed.

When it is desired to use the device for a scoop it is held substantially as illustrated in Figure 10. In this way the directing member 3 serves as the handle and the container or cavity 1 serves as the scoop proper.

For transplanting small plants the tip 13 of the directing and locating member 3 may be forced into the soil adjacent to the stem and root of the plant. Then when the directing and locating member 3 is given a lateral prying movement, the soil with the plant is raised by the tip 13 so that it can be withdrawn for transplanting.

For layout purposes the device is held as shown in Figure 7 which permits the tip 13 to be moved over and manipulated in the soil in any desired manner.

Of course, the device herein specifically shown and described may be changed and modified in various ways to meet the particular condition in which it is to be used, without departing from the scope of the invention as indicated by the appended claims.

I claim:

1. A device for holding a plurality of small elements in one hand and then selectively separating and dispensing said elements with a cooperative finger of said hand, which comprises: a handle structure; a neck section on said handle structure; a cavity for holding said elements in said handle structure; said cavity having a bottom surrounded by a wall with a portion of said wall inclined upwardly to said neck section; a chute on said neck section extending above and below the bottom of said cavity and having an inlet above the bottom of said cavity; a transfer surface on said neck section connecting the top of said inclined wall portion of said cavity with the inlet of said chute; and trap means indented in said transfer surface.

2. A device for holding a plurality of small elements in one hand and then selectively separating and dispensing said elements with a cooperative finger of said hand, which comprises: a handle structure; a neck section on said handle structure; a cavity for holding said elements in said handle structure; said cavity having a bottom surrounded by a wall with a portion of said wall inclined upwardly to said neck section; a chute on said neck section extending above and below the bottom of said cavity and having an inlet above the bottom of said cavity; a transfer surface on said neck section connecting the top of said inclined wall portion of said cavity with the inlet of said chute; and a separating ridge transversely of said transfer surface.

3. A device for holding a plurality of small elements in one hand and then selectively separating and dispensing said elements with a cooperative finger of said hand, which comprises: a handle structure; a neck section on said handle structure; a cavity for holding said elements in said handle structure; said cavity having a bottom surrounded by a wall with a portion of said wall inclined upwardly to said neck section; a chute on said neck section extending above and below the bottom of said cavity and having an inlet above the bottom of said cavity; a transfer surface on said neck section connecting the top of said inclined wall portion of said cavity with the inlet of said chute; and a channel in said transfer surface having its walls converging to the inlet of said chute.

4. A device for holding a plurality of small elements in one hand and then selectively separating and dispensing said elements with a cooperative finger of said hand, which comprises: a handle structure; a neck section on said handle structure; a cavity for holding said elements in said handle structure; said cavity having a bottom surrounded by a wall with a portion of said wall inclined upwardly to said neck section; a chute on said neck section extending above and below the bottom of said cavity and having an inlet above the bottom of said cavity; and a transfer surface stepped upwardly to said chute inlet and connecting said inclined wall portion of said cavity with said chute inlet.

ERIC ISCHINGER, Sr.

References Cited in the file of this patent

UNITED STATES PATENTS

| Number | Name | Date |
|---|---|---|
| 62,380 | Van Vleck | Feb. 26, 1867 |
| 125,324 | Paine | Apr. 2, 1872 |
| 540,458 | Robbins | June 4, 1895 |
| 954,576 | Logan | Apr. 12, 1910 |
| 1,471,291 | Schling | Oct. 16, 1923 |
| 1,694,381 | Hartman | Dec. 11, 1928 |
| 2,065,319 | Lewis | Dec. 22, 1936 |
| 2,157,481 | Cothern | May 9, 1939 |

FOREIGN PATENTS

| Number | Country | Date |
|---|---|---|
| 12,603 | Great Britain | 1912 |
| 22,334 | Great Britain | 1912 |
| 80,918 | Switzerland | Apr. 16, 1919 |
| 114,387 | Great Britain | Apr. 8, 1918 |
| 116,807 | Great Britain | June 27, 1918 |
| 546,726 | Great Britain | July 28, 1942 |
| 580,380 | Great Britain | Sept. 5, 1946 |
| 583,234 | Great Britain | Dec. 12, 1945 |
| 896,473 | France | May 2, 1944 |